United States Patent [19]

Kessels et al.

[11] Patent Number: 4,720,994

[45] Date of Patent: Jan. 26, 1988

[54] METHOD AND APPARATUS FOR THE DETECTABLE RELEASE OF GASES

[75] Inventors: Winfried Kessels, Burgdalf; Klaus Müller, Braunschweig-Stöckhelm; Martinus Telgmann, Greven, all of Fed. Rep. of Germany

[73] Assignee: Gesellschaft für Strahlen- und Unweltforschung mbH, Neuherberg, Fed. Rep. of Germany

[21] Appl. No.: 891,371

[22] Filed: Jul. 31, 1986

[30] Foreign Application Priority Data

Jul. 31, 1985 [DE] Fed. Rep. of Germany ....... 3527397

[51] Int. Cl.[4] .............................................. G01M 3/00

[52] U.S. Cl. ..................................... 73/49.3; 116/106; 116/137 R

[58] Field of Search ...................... 73/40.7, 49.3, 49.2; 116/106, 218, 137 R

[56] References Cited

U.S. PATENT DOCUMENTS 2,760,461 8/1956 Showstack .......................... 116/106

4,080,822 3/1978 Steinback ............................ 73/40.7

4,188,818 2/1980 Garrison ............................. 73/40.7

*Primary Examiner*—Stewart J. Levy

*Assistant Examiner*—Hezron E. Williams

*Attorney, Agent, or Firm*—Spencer & Frank

[57] ABSTRACT

A method and apparatus with which a sealed gas containing first container, which is disposed in a sealed inaccessible and not visually observable further container, can be detectably opened. A thermally inducible opening mechanism disposed in a gas flow or connecting path in the wall of the first container is actuated and the gas escaping through the connecting path is detected acoustically. Among other uses, the invention can be used, in particular, for containers having radioactive contents which can be manipulated, welded and leak checked only in hot cells. The method is particularly suitable for leak checking fuel element containers or molds containing highly radioactive vitrified waste since the closing member of the first container can be composed of a soft solder plug and this plug can be melted out by local heating.

14 Claims, 2 Drawing Figures

METHOD AND APPARATUS FOR THE DETECTABLE RELEASE OF GASES

BACKGROUND OF THE INVENTION

The present invention relates to a method for the detectable release of gas which is stored in the interior of a first container into the interior of a second container which is sealed from the exterior and to an apparatus for implementing the method.

A particular problem exists when checking containers for leaks by means of a helium leak test or when starting up chemical reactions by the defined release of one or a plurality of the reaction partners in a container that is sealed externally if this container has no passages or openings in its interior, for example for the purpose of manipulating devices disposed in sealed containers. Each actuating mechanism involved, e.g., valves, must then act through a completely sealed wall, so that the actuation signals for these mechanisms must be thermal or electromagnetic signals. However, these types of signals do not permit any conclusion as to whether or not the desired effect has been realized within the container whose interior cannot be visually observed.

Leakage tests of containers with the aid of a helium leak test are disclosed in detail in various textbooks, e.g., Wutz, Adam, Walcher, "Theorie und Praxis der Vacuum-technik" (Theory and Practice of Vacuum Technology) (1982), or pages 10.3 and 10.4 of the catalog of Leybold. In this process, either the container to be tested is placed into a pressure chamber filled with helium and the quantity of helium which penetrated into the container itself is measured, or the container interior is charged with helium, is placed into a vacuum chamber and the quantity of helium escaping from the container is measured.

Another method is the so-called "bombing" method, wherein the sealed container is placed into a pressure chamber and is kept in the helium atmosphere under pressure for a longer period of time. Then the pressure chamber is evacuated, and thereafter the helium escaping from the container is measured. From the measured values, a conclusion can then be drawn as to the leakage of the container.

Another method is the use of a cartridge which has a defined helium leakage through a defined capillary tube. This cartridge is placed into the container before the latter is sealed and then very slowly loses its helium content. Thereafter, the container is placed into a vacuum chamber and the quantity of helium leaving the container is measured. Alternatively, a valve disposed in a cavity can be connected to the container through which valve the container is filled with helium. The above-mentioned cavity is sealed against the environment by means of a plug or a closing screw and is additionally sealed by a welded seam.

These pressure and vacuum processes require a connection with the container which, upon completion of the leakage test, must again be sealed and again separately checked. This procedure is very complicated, particularly when checking containers having a radioactive content since, in such case, all manipulations, e.g. welding or unscrewing of fill or discharge pipes, must here be effected by remote control.

The "bombing" method has the drawback of not being very accurate (up to $10^{-4}$ mbar l/s). Moreover, the release of helium from a defined capillary tube has the drawback that, considering the possible leakage of the container and its detectability, a large quantity of helium must be introduced into the container which then, if the container is perfectly tight, results in a relatively great increase in pressure in the container.

SUMMARY OF THE INVENTION

It is an object of the present invention to provide a method and apparatus with which a sealed gas filled container disposed inside an inaccessible and non-transparent further container can be detectably opened.

The above object is achieved according to the invention by a method for detectable release of a gas stored in the interior of a first container, which is disposed in the interior of a further container which is sealed from the exterior, into the interior of the further container, and wherein the wall of the first container includes a gas flow path, which is sealed by a thermally inducible opening mechanism, for connecting the interior of the first container to the interior of the further container, and wherein the method comprises the steps of: thermally actuating the opening mechanism to open same and cause the gas to flow through the gas flow path; and, acoustically detecting the gas flowing through the gas flow path.

The above object is further achieved according to the invention by an apparatus for detectably releasing a gas into the interior of a sealed container comprising: a first container which is sealed from the exterior; a second container disposed within the first container and containing a gas under pressure which is to be released into the interior of the first container; first means, defining a gas flow path, for connecting the interior of the second container to the interior of the first container; a thermally responsive opening means, disposed in the first means, for normally sealing the first means and the second container; and an acoustical indicating means, disposed in the first means, for providing an acoustical indication in response to the flow of gas through the first means when the opening means is actuated.

Preferably, the opening means is a plug formed of a meltable material, e.g., a soft solder; the second container is a cartridge; means are provided for fastening the cartridge within the first container at a defined location; the first means includes a through bore in the wall of the cartridge; and the acoustical device is a whistle.

Special advantages result with the present invention in the leakage testing of containers by means of a helium test. The helium is here initially disposed in a cartridge which, before the container is sealed, is screwed into the container or merely placed into it. At a defined point in time which is freely selectable, the helium can then be briefly discharged into the container from the cartridge. The discharge of the helium can also be detected acoustically outside the container since the gas is discharged through a whistle. The sealing member for the cartridge i.e., the opening means is opened by an increase in temperature.

The invention can be used, in particular, for containers containing radioactive material which containers are to be manipulated, welded and leakage checked only in hot cells or compartments. The method is particularly well suited for leakage checks on fuel element containers or molds containing highly radioactive, vitrified waste, since the sealing member of the cartridge is composed of a plug of soft solder and this plug can be melted out by local heating.

Therefore, the method according to the invention can be used in hot compartments without major modifications, with great increases in pressure in the container being avoided. Moreover, according to the disclosed invention, the introduction can also be effected at high temperatures, the time required for sealing (welding shut) the container is without influence on the accuracy of the measurement, and a precisely defined quantity of helium is released at a defined moment in time. Finally, when employing the present invention the container structure is not weakened, or more specifically, such weakening can be avoided.

DETAILED DESCRIPTION OF THE PREFERRED EMBODIMENT

The description here refers to the special case of a cartridge as it may be used, in principle, in molds for vitrified, highly radioactive waste. The dimensioning was here done in such a manner that, after release of the helium gas, a partial pressure of about 0.2 bar He is produced in the free volume or cavity of the mold. It is to be understood that the following explanation with reference to a specific example does not limit use of the cartridge in some other form and with other dimensions.

Figure 1:
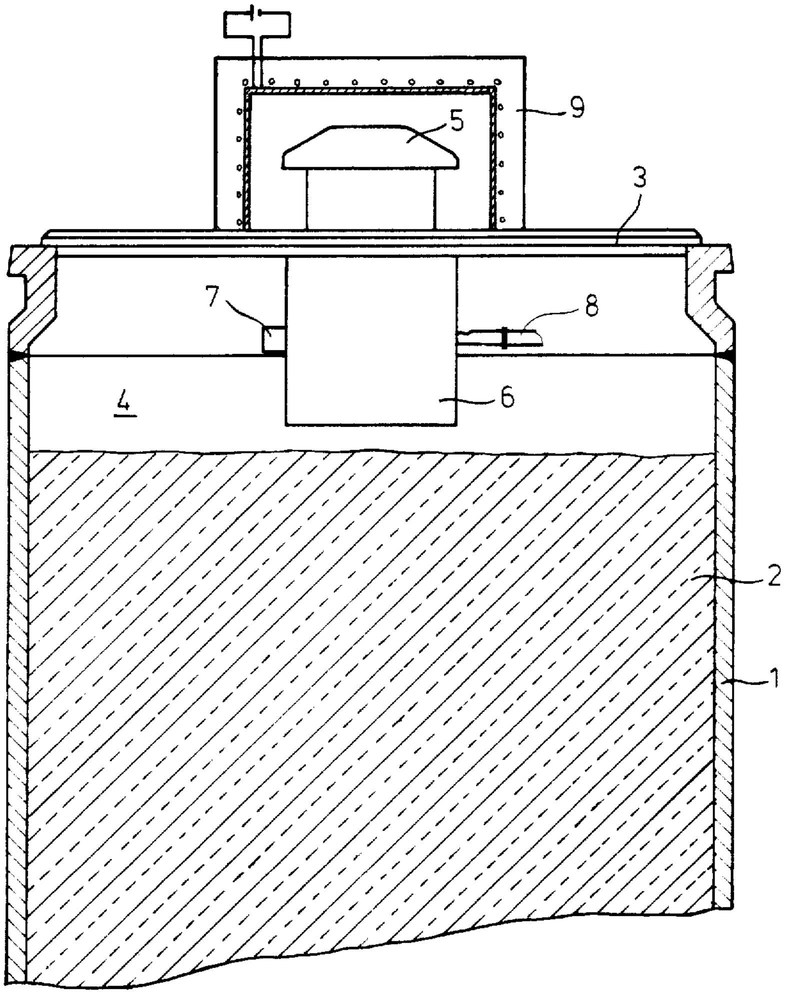
FIG. 1 is a schematic partial sectional view generally showing the apparatus according to the invention for carrying out the method according to the invention in a container or mold for vitrified, highly radioactive waste.

Referring now to FIG. 1, there is shown a schematic sectional view of a mold 1 in which vitrified radioactive waste 2 is to be accommodated to a level such that a cavity or chamber 4 remains between the upper surface of the waste 2 and a tightly welded-on cover 3. The outer surface of the cover 3 is provided with an outwardly, i.e., upwardly, extending circular projection or mushroom head 5 in order to enable manipulation of the sealed mold 1, 3. Below the mushroom head 5, a sealed cartridge 6 is disposed within the cavity 4. The cartridge 6 contains helium which is to be released into the cavity 4 after welding on of the cover 3. The cartridge 6 is provided with a valve 7 for introducing the helium gas into the cartridge 6. This valve 7 is closed tightly when the cartridge 6 is installed in the mold 1 and remains closed. In the specific illustrated embodiment, the cartridge 6 is to be screwed into the cylindrical stem portion of the mushroom head 5 of the mold cover 3. Accordingly, before this is done, the cartridge 6 is filled through valve 7 with a predetermined quantity of helium under pressure. The container 6 is also provided with an acoustic indicating device, preferably a whistle 8 as shown, which is connected in a gas flow path between the interior of the cartridge 6 and the cavity 4 so as to provide an acoustic indication when the helium gas is released from the cartridge 6. Finally, disposed above the mushroom head 5 on the cover 3 is a heating device 9 which surrounds the mushroom head 5 and whose operation and purpose will be described in connection with FIG. 2.

Figure 2:
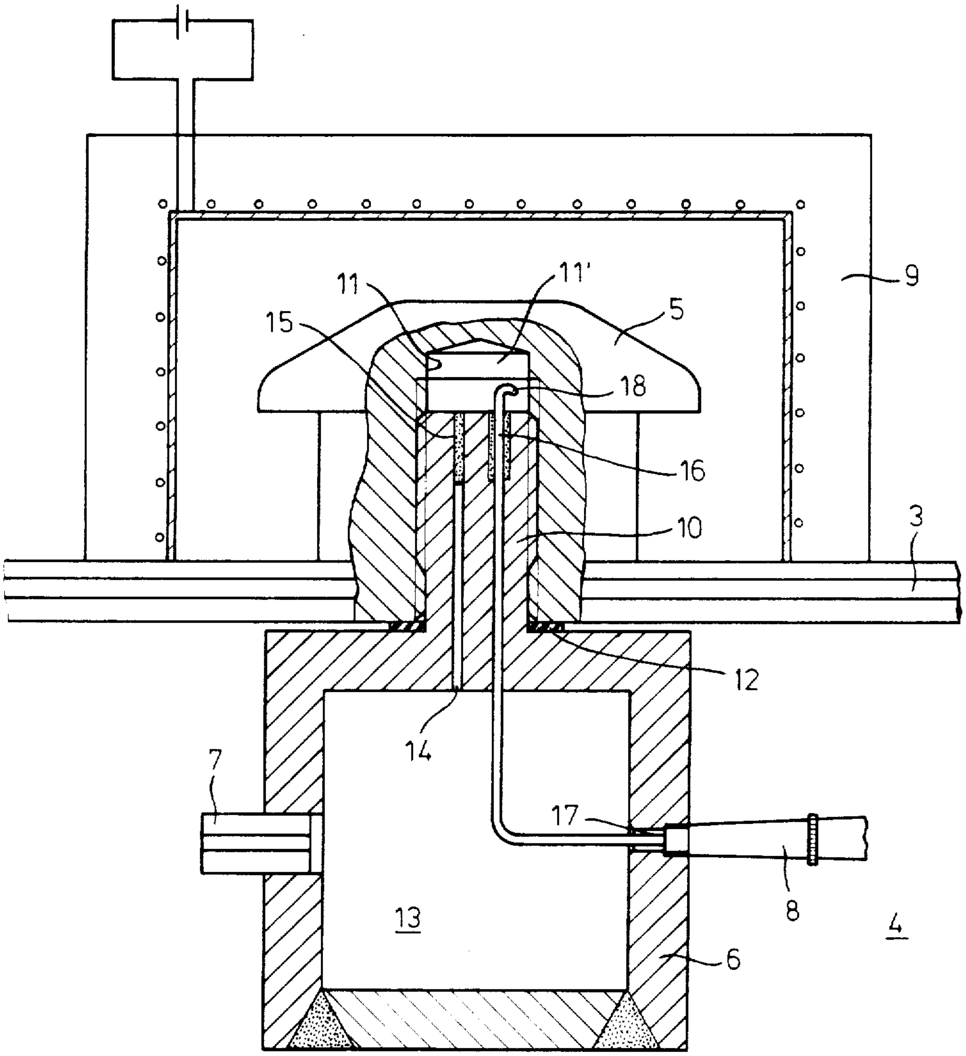
FIG. 2 is an enlarged schematic detailed sectional view of the preferred embodiment of the apparatus according to the invention shown in FIG. 1.

As shown in FIG. 2, which is a partial sectional view of the region near the cartridge 6 toward mushroom head 5, the cartridge 6 is provided with a circular projection or extension 10 which is screwed from the bottom into an outwardly directed longitudinally extending blind bore 11 formed in the interior of mushroom head 5. A gasket 12, which surrounds projection 10, is provided to seal the bore 11. As shown, the length of the projection 10 is less than the depth of the bore 11, so that a recess or cavity 11' is formed between the end surface of the projection 10 and the bottom of the blind bore 11. In order to form a connecting or gas flow path from the gas filled interior 13 of cartridge 6 to the cavity 4 of the sealed outer container or mold 1, 3, a longitudinally extending through bore 14 is provided in the projection 10 and through the wall of the container 6 to connect the interior 13 of the cartridge 6 to the recess 11'. The upper end of the bore 14, i.e., in the region adjacent the cavity 11', is sealed by means of a soft solder plug 15 until a temperature is reached, by actuation of the heating device 9 and by heat transfer through mushroom head 5 to the projection 10, which causes the plug 15 to melt. Thereafter, the gas (He) disposed in the interior 13 of cartridge 6 ejects the molten material from the bore 14 into the recess 11', which thus serves as a collection chamber for both the released gas and the molten material of the plug 15.

The remainder of the gas-flow or connecting path between the interior 13 of the cartridge 6 and the cavity 4 is formed by a capillary tube 16 which extends through the projection 10 and the interior 13 of cartridge 6 and has its outlet end connected to the inlet 17 of the whistle 8 which then emits an acoustical signal when gas is flowing through the capillary tube 16. As shown, the whistle 8 is mounted in a through bore in the wall of the cartridge 6 and disposed outside of same in the cavity 4.

The inlet or access end 18 of the capillary tube 16 is disposed in the recess 11' so that gas flowing into recess 11' via bore 14 is forced to flow out through the whistle 8 into the cavity 4. In order to prevent the capillary tube 16 from being plugged up by the melted soft solder material of plug 15 which is ejected into the recess 11', the access end 18 of the capillary tube 16 preferably extends beyond the end surface of the projection 10 and is bent so that if faces away from the adjacent outlet end of bore 14. It should be noted that if the walls of cartridge 6 are sufficiently thick, the capillary tube 16 may extend completely within the wall material to the inlet of whistle 8. Moreover, if a plurality of cartridges 6 are provided, the tone of the respective whistles and/or, the melting temperature of the soft solder plugs 15 may be varied. Finally, it should further be noted, that if required by a particular case, the whistle 8 could also be placed directly onto the bore 14 if the molten material of closing plug 15 is unable to clog the whistle 8, i.e. make it ineffective. Bore 14 and capillary 16 thus together form the desired gas-flow or connecting path between the interior or gas chamber 13 and the whistle 8.

If the helium is released from cartridge 6, this is effected, as discussed above, through the bore 14 which, before the release, is terminated by the soft solder plug 15. The melting point of the soft solder thus determines the temperature at which the release of the gas takes place. This sudden release, or more specifically, the melting of plug 15, is initiated by the heating device 9 which is placed over the mushroom head 5. With the use of the most varied soft solders, the melting point of the plug 15 can be set from 30° C. up to several 100° C. The gas released into the recess 11' then flows (briefly, in a relatively large quantity) through the capillary tube 16 and the whistle 8 into the chamber or cavity 4 to be checked. The acoustic signal produced by the whistle 8 thereby indicates that gas is flowing out of the cartridge 6. The capillary tube 16 and the whistle 8 are connected to or built into the cartridge 6 in a gas-tight manner, e.g. soldered in, as is the valve 7 which is shown only schematically.

The dimensions of the cartridge 6 (volume and pressure) depend on the required measuring accuracy of the system, on the sensitivity of the mass spectrometer employed for the measurement and on the temperature at which the measurement is being made, as well as on the free volume which must be filled with helium. The advantage of the entire system is that it is possible to positively release the gas.

As an alternative to forming plug 15 of soft solder, the bore 14 can also be sealed with bimetal elements, disintegratable chemical compounds and the like.

It should be noted that although the invention has been specifically described for use in detecting leaks in sealed containers, it is to be understood that it can equally well be used for other applications. For example, the method and apparatus can equally well be used to start up a chemical reaction in the sealed outer container by the release of a gas contained in the cartridge.

The present disclosure relates to the subject matter disclosed in Federal Republic of Germany Patent application No. P 35 27 397.6, filed July 31st, 1985, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. Apparatus for detectably releasing a gas into the interior of a sealed container comprising:

a first container which is sealed from the exterior; a second container in the form of a cartridge disposed within said first container and containing a gas under pressure which is to be released into the interior of said first container; fastening means for fastening said cartridge within said first container at a defined location; first means, defining a gas flow path, and including a throughbore in the wall of said cartridge and a capillary tube, for connecting the interior of said cartridge to the interior of said first container; a thermally responsive opening means, disposed in said first means, for normally sealing said first means and said cartridge; and an acoustical indicating means, comprising a whistle disposed in said first means, for providing an acoustical indication in response to the flow of gas through said first means when said opening means in actuated.

2. Apparatus as defined in claim 1 wherein said opening means is a plug formed of a meltable material.

3. Apparatus as defined in claim 1 wherein said opening means is disposed in said through bore.

4. Apparatus as defined in claim 1 wherein said whistle is mounted on and disposed outside of said cartridge.

5. Apparatus as defined in claim 1 wherein: said cartridge has a circular outwardly extending projection; said through bore and said capillary tube extend through said projection; and said first means further comprises means for causing gas flowing out of said through bore to flow through said capillary tube.

6. Apparatus as defined in claim 5 wherein: said first container is provided with an outwardly extending projection having an outwardly directed longitudinally extending blind bore; and said projection of said second container is disposed in said blind bore.

7. Apparatus as defined in claim 6 wherein said capillary tube is directly connected to the inlet of said whistle.

8. Apparatus as defined in claim 7 wherein: said projection of said cartridge is shorter than said blind bore whereby a chamber, which constitutes said means for causing, is formed between the end surface of said projection of said cartridge and the bottom of said blind bore so as to serve as a gas collection chamber which is in communication with said inlet of said whistle via said capillary tube.

9. Apparatus as defined in claim 8 wherein said opening means is a plug formed of a meltable material disposed in said through bore within said projection of said cartridge, whereby said chamber likewise serves as a collection chamber for the melted material.

10. Apparatus as defined in claim 9 wherein the end of said capillary tube which is in communication with said chamber is bent in a direction facing away from the adjacent end of said through bore.

11. Apparatus as defined in claim 8 wherein said opening means is disposed within said projection of said cartridge.

12. Apparatus as defined in claim 11 further comprising heating means for simultaneously heating both of said projections so as to actuate said opening means.

13. Apparatus as defined in claim 1 wherein the outlet end of said capillary tube is directly connected to the inlet of said whistle.

14. Apparatus as defined in claim 6 wherein said projection of said cartridge is shorter than said blind bore whereby a chamber, which constitutes said means for causing, is formed between the end surface of said projection of said cartridge and the bottom of said blind bore.

* * * * *

UNITED STATES PATENT AND TRADEMARK OFFICE

CERTIFICATE OF CORRECTION

PATENT NO. : 4,720,994

DATED : January 26, 1988

INVENTOR(S) : Winfried Kessels et al

It is certified that error appears in the above-identified patent and that said Letters Patent is hereby corrected as shown below:

n the heading of the patent, under [73], the first word of the second ine of the Assignee's name should read --Umweltforschung--.

Signed and Sealed this

Fifth Day of July, 1988

*Attest:*

DONALD J. QUIGG

*Attesting Officer*

*Commissioner of Patents and Trademarks*